US012807484B2

(12) United States Patent
Detweiler et al.

(10) Patent No.: US 12,807,484 B2
(45) Date of Patent: Nov. 24, 2026

(54) AMMONIA PRODUCTION PROCESS

(71) Applicants: American Air Liquide, Inc., Fremont, CA (US); L'Air Liquide, Société Anonyme pour l'Etude et l'Exploitation des Procédés Georges Claude, Paris (FR)

(72) Inventors: Dayne Detweiler, Houston, TX (US); Sayan Dasgupta, Frankfurt am Main (DE); Alexander Roesch, Butzbach (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 525 days.

(21) Appl. No.: 18/375,859

(22) Filed: Oct. 2, 2023

(65) Prior Publication Data

US 2024/0400381 A1 Dec. 5, 2024

Related U.S. Application Data

(60) Provisional application No. 63/469,839, filed on May 31, 2023.

(51) Int. Cl.

| | |
|---|---|
| ***C01B 3/025*** | (2026.01) |
| ***C01B 3/16*** | (2006.01) |
| ***C01B 3/38*** | (2026.01) |
| ***C01B 3/382*** | (2026.01) |
| ***C01B 3/48*** | (2006.01) |
| ***C01B 3/50*** | (2026.01) |
| ***C01C 1/04*** | (2006.01) |

(52) U.S. Cl.

CPC ................ *C01B 3/025* (2013.01); *C01B 3/16* (2013.01); *C01B 3/38* (2013.01); *C01B 3/50* (2013.01); *C01C 1/0405* (2013.01); *C01B 2203/0244* (2013.01); *C01B 2203/0283* (2013.01); *C01B 2203/0475* (2013.01); *C01B 2203/068* (2013.01); *C01B 2203/0833* (2013.01); *C01B 2203/085* (2013.01); *C01B 2203/0883* (2013.01); *C01B 2203/0894* (2013.01); *C01B 2203/1235* (2013.01)

(58) Field of Classification Search

CPC .. C01B 3/025; C01B 3/16; C01B 3/38; C01B 3/50; C01C 1/0405

See application file for complete search history.

(56) References Cited

U.S. PATENT DOCUMENTS

| | | | | |
|---|---|---|---|---|
| 11,498,834 | B1 | 11/2022 | Spicer et al. | |
| 11,512,257 | B1 | 11/2022 | Spicer et al. | |
| 2013/0243686 | A1* | 9/2013 | Genkin | C01B 3/52 423/651 |
| 2019/0047852 | A1* | 2/2019 | Pach | C01B 3/48 |
| 2022/0048768 | A1 | 2/2022 | Schmidt et al. | |
| 2024/0400385 | A1* | 12/2024 | Detweiler | C01B 3/382 |

FOREIGN PATENT DOCUMENTS

| | | | | |
|---|---|---|---|---|
| EP | 2233433 A1 * | 9/2010 | | C01B 3/48 |
| EP | 3 954 650 | 2/2022 | | |
| EP | 3 988 502 | 4/2022 | | |
| WO | WO 2020 150245 | 7/2020 | | |
| WO | WO 2022 003312 | 1/2022 | | |
| WO | WO 2022 038089 | 2/2022 | | |

* cited by examiner

*Primary Examiner* — Yong L Chu

(74) *Attorney, Agent, or Firm* — Allen E. White; Elwood L. Haynes

(57) ABSTRACT

Process and method to produce ammonia with high $CO_2$ capture rate. The invention entails production of ammonia in an efficient and innovative way with minimum carbon emissions within the production unit by use of only one $CO_2$ removal unit and a minimum process heat exchange duties provided by heat of combustion. The proposed novel solution allows achieving a direct $CO_2$ capture rate of >95% by the autothermal reforming based ammonia production process with one $CO_2$ removal unit with an efficient thermal integration and a low duty fired heater ensuring minimum direct carbon emission.

18 Claims, 4 Drawing Sheets

AMMONIA PRODUCTION PROCESS

CROSS REFERENCE TO RELATED APPLICATIONS

This application claims the benefit of priority under 35 U.S.C. § 119 (a) and (b) to U.S. Provisional Patent Application No. 63/469,839, filed May 31, 2023, the entire contents of which are incorporated herein by reference.

BACKGROUND

Ammonia production is currently associated with substantial $CO_2$ emissions as the syngas for ammonia production is generated by reforming at multiple steps—one primary reforming step which takes place in a classical tubular steam methane reformer with a combustion furnace; followed by a secondary reforming step which takes place in a catalytic reactor vessel. In this reactor vessel, air (which contains $N_2$ molecules) is introduced which helps in partial combustion of hydrocarbon molecules coming from the primary reforming step before the gas enters the catalyst layer of the reactor vessel. When the gas enters the catalyst layer, the secondary reforming takes place enhancing the conversion of hydrocarbon to CO and $H_2$. As the combustion furnace is inevitable with the conventional tubular steam methane reformer, a considerable amount of flue gas is emitted through the furnace exit which contains a considerable amount of $CO_2$ and thus makes the whole process significantly $CO_2$-intensive.

Classical ammonia plant configurations intrinsically include one $CO_2$ capture step before final conditioning of ammonia synthesis gas in order to protect the ammonia synthesis catalyst. This step can be considered as a "pre-combustion $CO_2$ capture step" as the "capturable $CO_2$" is generated only from reforming and shift reaction and not by combustion. Pre-combustion $CO_2$ capture can achieve an overall $CO_2$ capture of ~50-60% with conventional tubular steam methane reforming (SMR) based syngas generation process.

However, with this configuration, the overall direct $CO_2$ capture rate is poor as a significant amount of $CO_2$ gets emitted via flue gas. To increase the overall capture rate, there are only two options as follows:

Post-combustion capture of $CO_2$: A unit for capturing $CO_2$ emitted via flue gas (absorption and/or cryogenic) and by that, overall carbon capture rate can be enhanced and emission can be reduced. However, capture of $CO_2$ from flue gas is less efficient attributing to its availability at lower concentration (hence lower partial pressure) resulting in higher operational cost and capital investments in combination with significantly higher plot area requirement.

Additional production of $H_2$-rich synthesis gas: Alternatively, to avoid the flue gas $CO_2$ capture unit, additional $H_2$-rich syngas can be produced via reforming and shift and then routing the surplus $H_2$ (via $H_2$-rich gas) to the combustion furnace of the tubular steam reformer. Firing of $H_2$-rich gas reduces $CO_2$ emission through the furnace. However, this means processing of additional feedstock and higher material flow through the gas production unit, thereby increasing the operational cost and capital investments significantly.

To avoid the inefficiency and cost penalty caused by either of the abovementioned two approaches, ammonia production can include only one autothermal reforming step instead of primary and secondary reforming steps (as described earlier). Instead of a big combustion furnace associated with a tubular reformer and high flow of flue gas, the Autothermal process is normally associated with a fired heater with much lower process heat duty requirements compared to SMR furnace and therefore resulting in much less flue gas flow and emissions. That is why, in an Autothermal reforming based process for generation of ammonia synthesis gas, intrinsic $CO_2$ capture of 85-90% is achieved from produced syngas.

Main thermal duty exchanges in the fired heater in an autothermal reforming based ammonia synthesis gas generation configuration, correspond to some process heat exchange which may include preheating of gas entering the feedstock purification section (e.g. hydrogenation and/or desulfurization section) and/or preheating of gas entering different steps of reforming (e.g. pre-reformer or autothermal reformer reactor) and/or superheating of steam produced in the process. All these process thermal duty demands govern the firing required in the fired heater and thus govern the extent of $CO_2$ emissions. This $CO_2$ emission results in the intrinsic $CO_2$ capture rate of 85-90%. The $CO_2$ capture rate can be increased by firing a split stream of product $H_2$ in the fired heater as fuel. This method reduces the hydrocarbon fuel consumption and thereby reduces the carbon emission through the fired heater leading to a direct carbon capture rate >95%.

However, to generate this additional $H_2$ to be used as fuel, more hydrocarbon feed needs to be reformed and the carbon footprint of the process is increased by that resulting in higher Scope 3 emissions. Also, to reform more hydrocarbon feedstock, more oxygen intake is also required, which means higher power consumption by the Air Separation Unit. Hence, enhancing the $CO_2$ capture is realized by increasing the Scope 2 (electricity import) and Scope 3 (hydrocarbon feedstock) emissions which is counter-productive in terms of overall emissions. Or in other words, direct emissions are minimized by increasing indirect emissions.

In one embodiment of the current invention, the proposed novel solution allows achieving a direct $CO_2$ capture rate of >95% by the autothermal reforming based ammonia production process with one $CO_2$ removal unit with an efficient thermal integration and a low duty fired heater ensuring minimum direct carbon emission.

SUMMARY

Process and method to produce ammonia with high $CO_2$ capture rate. The invention entails production of ammonia in an efficient and innovative way with minimum carbon emissions within the production unit by use of only one $CO_2$ removal unit and a minimum process heat exchange duties provided by heat of combustion. The proposed novel solution allows achieving a direct $CO_2$ capture rate of >95% by the autothermal reforming based ammonia production process with one $CO_2$ removal unit with an efficient thermal integration and a low duty fired heater ensuring minimum direct carbon emission.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

Figure 1:
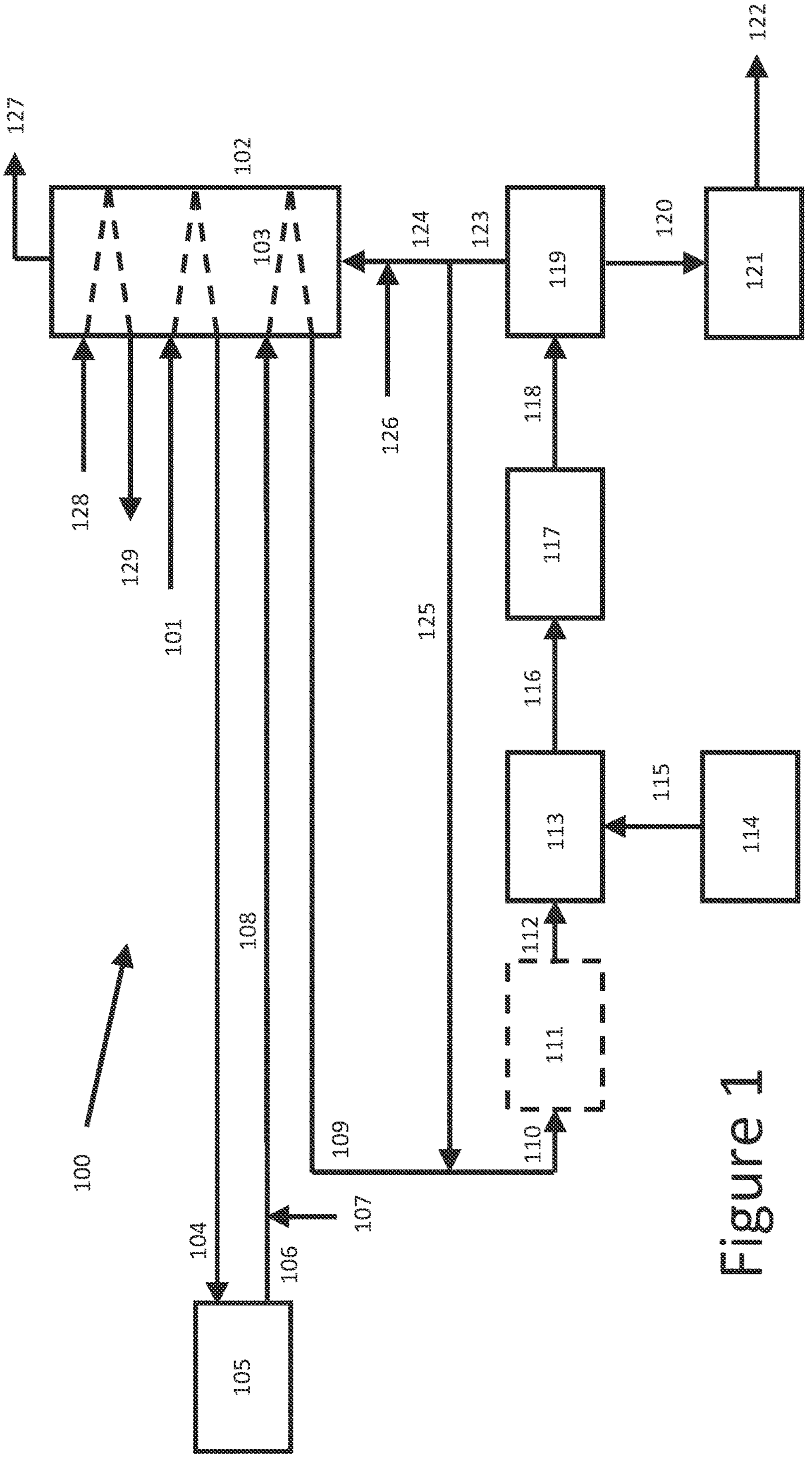
FIG. 1 is a schematic representation of a basic state-of-the-art ammonia plant utilizing autothermal reformer, as is known in the art.

100=ammonia plant as known in the art
101=hydrocarbon feedstock stream
102=fired heater
103=heat exchange coils
104=heated feedstock stream
105=hydrogen desulfurization unit
106=desulfurized feed stream
107=steam stream
108=ATR feed stream
109=heated ATR feed stream
110=combined ATR feed stream
111=(optional) pre-reformer
112=combined (optionally pre-reformed) ATR feed stream
113=ATR
114=ASU
115=oxygen containing stream
116=raw syngas stream
117=water-gas shift converter
118=shifted syngas stream
119=hydrogen separation device
120=ammonia synthesis stream
121=ammonia synthesis reactor
122=raw ammonia stream
123=purge gas stream
124=purge gas fuel stream
125=purge gas recycle stream
126=hydrocarbon fuel stream
127=flue gas stream
200=ammonia plant according to the present invention
201=hydrocarbon feedstock stream
202=hydrogen desulfurization unit
203=desulfurized feed stream
204=steam stream
205=ATR feed stream
206=fired heater
207=heat exchange coils
208=heated ATR feed stream
209=combined ATR feed stream
210=(optional) pre-reformer
211=combined (optionally pre-reformed) ATR feed stream
212=ATR
213=ASU
214=oxygen containing stream
215=raw syngas stream
216=water-gas shift converter
217=shifted syngas stream
218=first shifted syngas stream
219=second shifted syngas stream
220=first heat exchanger
221=saturated steam stream
222=superheated steam stream
223=second heat exchanger
224=heat transfer line for second heat exchanger
225=heat transfer line for second heat exchanger
226=first cooled shifted syngas stream
227=second cooled shifted syngas stream
228=cooled shifted syngas stream
229=CO2 Capture unit+hydrogen separation/synthesis gas preparation device
230=hydrogen rich stream/ammonia synthesis stream
230*a*=ammonia synthesis stream
231=ammonia synthesis reactor
232=raw ammonia stream
234=purge gas stream
235=purge gas fuel stream
236=purge gas recycle stream
237=hydrocarbon fuel stream
238=flue gas stream
240=nitrogen containing stream
243=feed preheater
244=heat transfer line for feed preheater
245=heat transfer line for feed preheater
300=ammonia plant according to the present invention
301=hydrocarbon feedstock stream
302=hydrogen desulfurization unit
303=desulfurized feed stream
304=steam stream
305=ATR feed stream
306=fired heater
307=heat exchange coils
308=heated ATR feed stream
309=combined ATR feed stream
310=(optional) pre-reformer
311=combined (optionally pre-reformed) ATR feed stream
312=ATR
313=ASU
314=oxygen containing stream
315=raw syngas stream
316=water-gas shift converter
317=shifted syngas stream
320=first heat exchanger
321=heat transfer line for first heat exchanger/saturated steam stream
322=heat transfer line for first heat exchanger/superheated steam stream
323=second heat exchanger
324=heat transfer line for second heat exchanger/saturated steam stream
325=heat transfer line for second heat exchanger/superheated steam stream
326=first cooled shifted syngas stream
327=second cooled shifted syngas stream
329=CO2 Capture unit+hydrogen separation/synthesis gas preparation device
330=hydrogen rich stream/ammonia synthesis stream
330*a*=ammonia synthesis stream
331=ammonia synthesis reactor
332=raw ammonia stream
334=purge gas stream
335=purge gas fuel stream
336=purge gas recycle stream
337=hydrocarbon fuel stream
338=flue gas stream
340=nitrogen containing stream
343=feed preheater
344=heat transfer line for feed preheater

345=heat transfer line for feed preheater
346=heated feedstock stream

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In one embodiment of the present invention, a method of producing low carbon ammonia is described wherein the direct carbon emissions are minimized without increasing any Scope 3 emissions and with a minimized impact on Scope 2 emissions, thus reducing the carbon intensity of the process.

Turning to FIG. 1, a basic state-of-the-art ammonia plant 100 utilizing autothermal reformer 113 is illustrated. ASU 114 produces oxygen containing stream 115. Hydrocarbon feedstock stream 101 is introduced into fired heater 102 wherein it is preheated in heat exchange coils 103, thus producing preheated feedstock stream 104 and flue gas stream 127. Preheated feedstock stream 104 is introduced into hydrogen desulfurization unit 105, thus producing desulfurized feed stream 106. Desulfurized feed stream 106 is combined with steam stream 107, thus forming ATR feed stream 108. ATR feed stream 108 is introduced into fired heater 102 thus producing preheated ATR feed stream 109. Saturated steam stream 128 is also introduced into fired heater 102, thus producing superheated steam stream 129. Saturated steam stream 128 may come from steam generating device located downstream ATR 113 and/or from steam generating device located downstream ammonia synthesis reactor 121.

Preheated ATR feed stream 109 is combined with purge gas recycle stream 125, thereby forming combined ATR feed stream 110. Combined ATR feed stream 110 may then be introduced into optional pre-reformer 111, thereby optionally producing pre-reformed ATR feed stream 112. Combined ATR feed stream 110, or optional pre-reformed ATR feed stream 112, is then introduced into ATR 113 along with oxygen containing stream 115, thereby forming raw syngas stream 116. Raw syngas stream 116 is then introduced into water-gas shift reactor 117, thereby producing shifted syngas stream 118. Shifted syngas stream 118 is then introduced into hydrogen separation device 119. Hydrogen separation device 119 produces ammonia synthesis gas stream 120 and purge gas stream 123.

Ammonia synthesis gas stream 120 is introduced into ammonia synthesis reactor 121, thereby producing raw ammonia stream 122. Purge gas stream 123 is divided into purge gas fuel stream 124 and purge gas recycle stream 125. Purge gas fuel stream 123 is combined with hydrocarbon fuel stream 126 and introduced as fuel into fired heater 102. Second portion 125 is combined with preheated ATR feed stream 109 to produce combined ATR feed stream 110.

State of the art autothermal reforming technologies are associated with at least one fired heater including heat exchange coils providing sufficient process heat. The temperature required for the different process steps of the production unit is provided by these heat exchanges. The heat duty required for this heat exchange is provided by firing of hydrocarbon fuel that leads to $CO_2$ emissions. Main thermal duty exchanges in the fired heater in an autothermal reforming based ammonia synthesis gas generation configuration, correspond to some process heat exchange which may include preheating of gas entering the feedstock purification section (e.g. hydrogenation and/or desulfurization section) and/or preheating of gas entering different steps of reforming (e.g. pre-reformer or autothermal reformer reactor) and superheating of steam produced in the process. All these process thermal duty demands govern the firing required in the fired heater and thus govern the extent of $CO_2$ emissions. The more heat exchange happens in the fired heater, heat duty requirement by fuel increases, and so increases the $CO_2$ emissions.

This $CO_2$ emission results in the intrinsic $CO_2$ capture rate of 85-90%. The $CO_2$ capture rate can be increased by producing more hydrogen than required as product by additional feedstock processing (reforming, shift, $CO_2$ removal, gas conditioning) and firing that additional $H_2$ product in the fired heater. This method reduces the hydrocarbon fuel consumption and thereby reduces the carbon emission through the fired heater leading to a direct carbon capture rate >95%.

However, to generate this additional $H_2$ to be used as fuel, more hydrocarbon feed needs to be reformed and the carbon footprint of the process is increased by that resulting in higher scope 3 emissions. Also, to reform more hydrocarbon feedstock, more oxygen intake is also required, which means higher power consumption by the Air Separation Unit. Hence, enhancing the $CO_2$ capture is realized by increasing the Scope 2 (electricity import) and Scope 3 (hydrocarbon feedstock) emissions which is counter-productive in terms of overall emissions. Or in other words, direct emissions are minimized by increasing indirect emissions. Thus, additional processing of feedstock has a direct adverse impact on carbon intensity as well as both operating and capital cost. Additional feedstock consumption, therefore higher oxygen, power and other utility consumption increases the operating cost. On the other hand, due to higher effective material flow, all equipment gets oversized and therefore the capital investment goes higher.

The present invention describes a method of producing low carbon ammonia by autothermal reforming process where the direct carbon emissions are minimized without increasing any scope 3 emissions and with a minimized impact on scope 2 emissions, thus reducing the overall carbon intensity of the ammonia production process.

Figure 2:
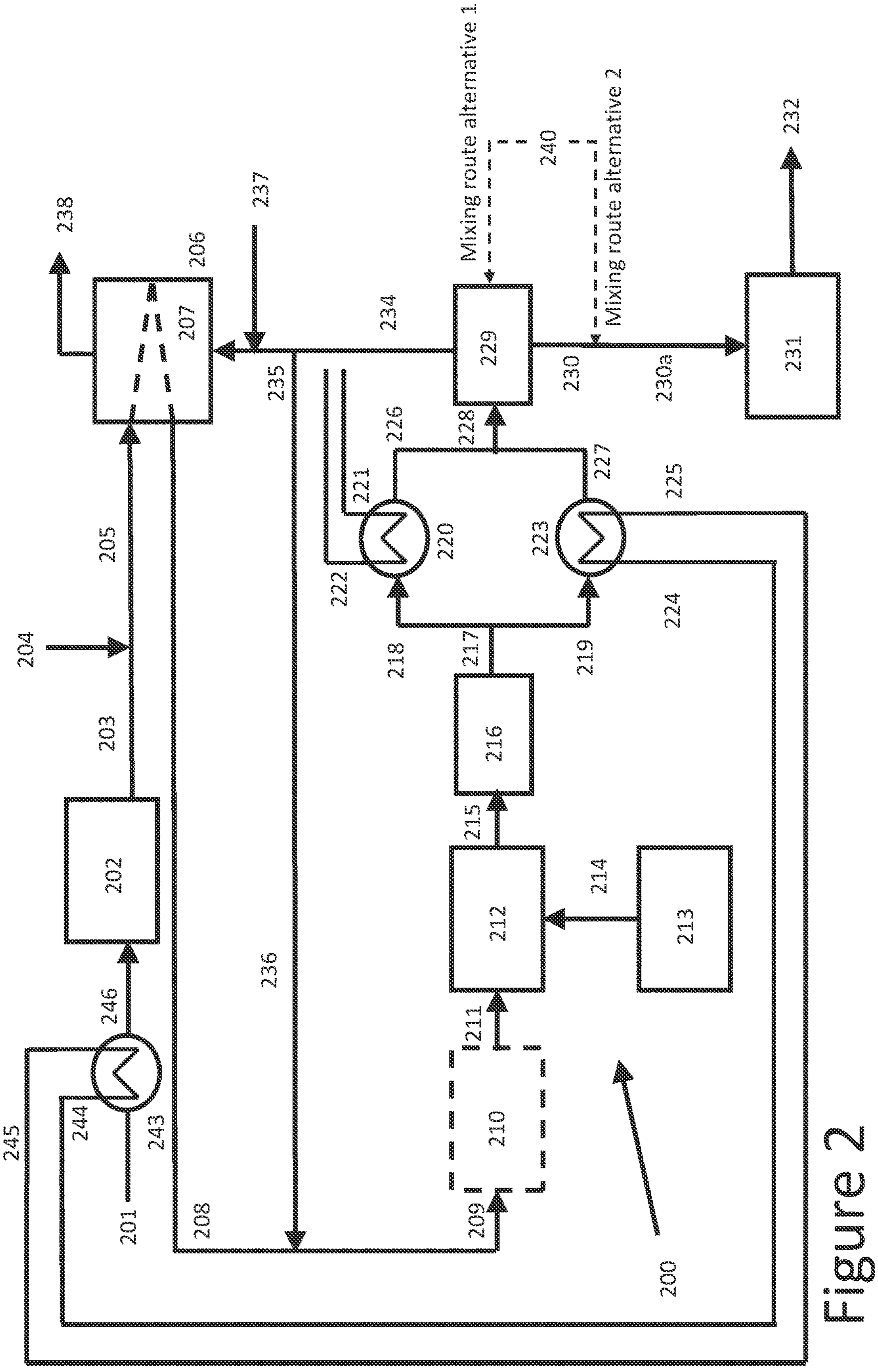
FIG. 2 is a schematic representation of one embodiment of an ammonia plant, in accordance with the present invention.

Turning to FIG. 2, one embodiment of an ammonia plant 200 in accordance with the present invention is illustrated. ASU 213 produces oxygen containing stream 214. Hydrocarbon feedstock stream 201 is heated in feedstock preheater 243, thus producing heated feedstock stream 246. The heat for this preheating, as indicated by heat exchange lines 244 and 245, may come from second heat exchanger 223, thus obtaining heat from shifted syngas stream 219. In this arrangement, heat exchange lines 244 and 245 are thermally connected to heat exchange lines 224 and 225.

Heated feedstock stream 246 is introduced into hydrogen desulfurization unit 202, thus producing desulfurized feed stream 203. Desulfurized feed stream 203 is combined with steam stream 204, thus generating ATR feed stream 205. ATR feed stream 205 is introduced into fired heater 206 thus producing preheated ATR feed stream 208, and flue gas stream 238. Heated ATR feed stream 208 is combined with purge gas recycle stream 236, thus forming combined ATR feed stream 209. Combined ATR feed stream 209 may then be introduced into optional pre-reformer 210, thereby optionally producing pre-reformed ATR feed stream 211. Combined ATR feed stream 209, or optional pre-reformed ATR feed stream 211, is then introduced into ATR 212 along with oxygen containing stream 214, thereby forming raw syngas stream 215.

Raw syngas stream 215 is introduced into water-gas shift reactor 216, thereby producing shifted syngas stream 217. Shifted syngas stream 217 is divided into first stream 218 and second stream 219. First shifted gas stream 218 is then introduced into first heat exchanger 220, thereby producing first cooled shifted syngas stream 226. The cooling of stream 218 may take place by providing heat to the saturated steam stream 221 produced in the steam generating device located downstream ATR 212 and/or from steam generating device located downstream ammonia synthesis reactor 231 resulting in superheated steam stream 222.

Second shifted gas stream 219 is then introduced into second heat exchanger 223 thereby producing second cooled shifted syngas stream 227. The cooling, as indicated by heat exchange lines 224 and 225, may come from feedstock preheater 243, thus providing heat to hydrocarbon feedstock stream 201. In this arrangement, heat exchange lines 224 and 225 are thermally connected to heat exchange lines 244 and 245.

First cooled shifted syngas stream 226 and second cooled shifted syngas stream 227 are combined, thus forming cooled shifted syngas stream 228. Cooled shifted syngas stream 228 is then introduced into CO2 capture unit and hydrogen separation device or synthesis gas preparation device 229. CO2 capture unit and hydrogen separation device or synthesis gas preparation device 229 produces hydrogen containing stream or ammonia synthesis gas stream 230 and purge gas stream 234. Nitrogen containing stream 240 may be added through mixing route alternative 1 to CO2 capture unit and synthesis gas preparation device 229 producing an ammonia synthesis gas stream 230/230*a*.

Alternatively, CO2 capture unit and hydrogen separation device 229 may generate a hydrogen-rich stream (>90 mole % H2) 230 and then gets mixed with Nitrogen containing stream 240 through mixing route alternative 2 producing an ammonia synthesis gas stream 230*a*. Mixing of Nitrogen containing stream 240 in both scenarios results in a hydrogen to nitrogen molar ratio of 3:1 in the ammonia synthesis gas stream 230*a*.

Ammonia synthesis gas stream 230*a* having hydrogen to nitrogen molar ratio of 3:1 is introduced into ammonia synthesis reactor 231, thereby producing raw ammonia stream 232.

Purge gas fuel stream 234 is divided into purge gas fuel stream 235 and purge gas recycle stream 236. Purge gas fuel stream 235 is combined with hydrocarbon fuel stream 237 and introduced as fuel into fired heater 206. Second portion 236 is combined with preheated ATR feed stream 208 to produce combined ATR feed stream 209.

Figure 3:
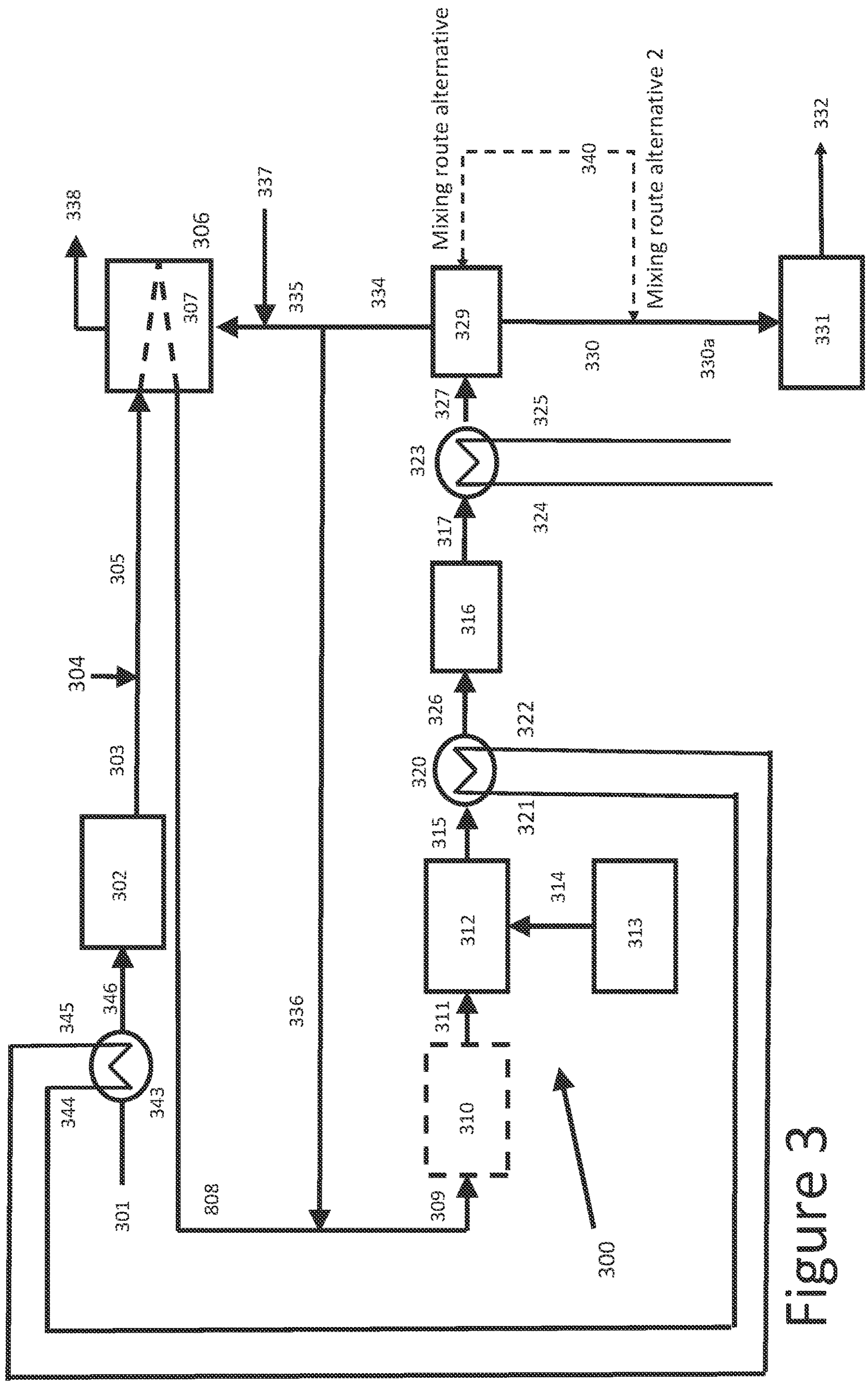
FIG. 3 is a schematic representation of another embodiment of an ammonia plant, in accordance with the present invention.

Turning first to FIG. 3, ASU 313 produces oxygen containing stream 314. Hydrocarbon feedstock stream 301 is heated in feedstock preheater 343, thus producing heated feedstock stream 346. The heat for this preheating, as indicated by heat transfer lines 344 and 345, may come from various internal heat sources, as discussed in detail below.

Heated feedstock stream 346 is introduced into hydrogen desulfurization unit 302, thus producing desulfurized feed stream 303. Desulfurized feed stream 303 is combined with steam stream 304, thus forming ATR feed stream 305. ATR feed stream 305 is introduced into fired heater 306 thus producing preheated ATR feed stream 308, and flue gas stream 338. Heated ATR feed stream 308 is combined with purge gas recycle stream 336, thus forming combined ATR feed stream 309. Combined ATR feed stream 309 may then be introduced into optional pre-reformer 310, thereby optionally producing pre-reformed ATR feed stream 311. Combined ATR feed stream 309, or optional pre-reformed ATR feed stream 311, is then introduced into ATR 312 along with oxygen containing stream 314, thereby forming raw syngas stream 315.

Raw syngas stream 315 is then introduced into first heat exchanger 320, thereby producing further first cooled shifted syngas stream 326. The cooling for first heat exchanger 320, as indicated by heat transfer lines 321 and 322, may come from various internal sources, as discussed in detail below. Further cooled raw syngas stream 326 is introduced into water-gas shift reactor 316, thereby producing shifted syngas stream 317. Shifted syngas stream 317 is introduced into second heat exchanger 323, thereby producing cooled shifted syngas stream 327. The cooling for second heat exchanger 323, may take place by providing heat to the saturated steam stream 324 produced in the steam generating device located downstream ATR 312 and/or from steam generating device located downstream ammonia synthesis reactor 331 resulting in superheated steam stream 325.

Cooled shifted syngas stream 327 is then introduced into CO2 capture unit and hydrogen separation device or synthesis gas preparation device 329. CO2 capture unit and hydrogen separation device or synthesis gas preparation device 329 produces hydrogen-rich stream or ammonia synthesis gas stream 330 and purge gas stream 334. Nitrogen containing stream 340 may be added through mixing route alternative 1 to CO2 capture unit and synthesis gas preparation device 329 producing an ammonia synthesis gas stream 330/330*a*.

Alternatively, CO2 capture unit and hydrogen separation device 329 may generate a hydrogen-rich stream (>90 mole % H2) 330 and then gets mixed with Nitrogen containing stream 340 through mixing route alternative 2 producing an ammonia synthesis gas stream 330*a*. Mixing of Nitrogen containing stream 340 in both scenarios results in a hydrogen to nitrogen molar ratio of 3:1 in the ammonia synthesis gas stream 330*a*.

Ammonia synthesis gas stream 330*a* having hydrogen to nitrogen molar ratio of 3:1 is introduced into ammonia synthesis reactor 331, thereby producing raw ammonia stream 332.

Purge gas fuel stream 334 is divided into purge gas fuel stream 335 and purge gas recycle stream 336. Purge gas fuel stream 335 is combined with hydrocarbon fuel stream 337 and introduced as fuel into fired heater 306. Second portion 336 is combined with preheated ATR feed stream 308 to produce combined ATR feed stream 309.

Figure 4:
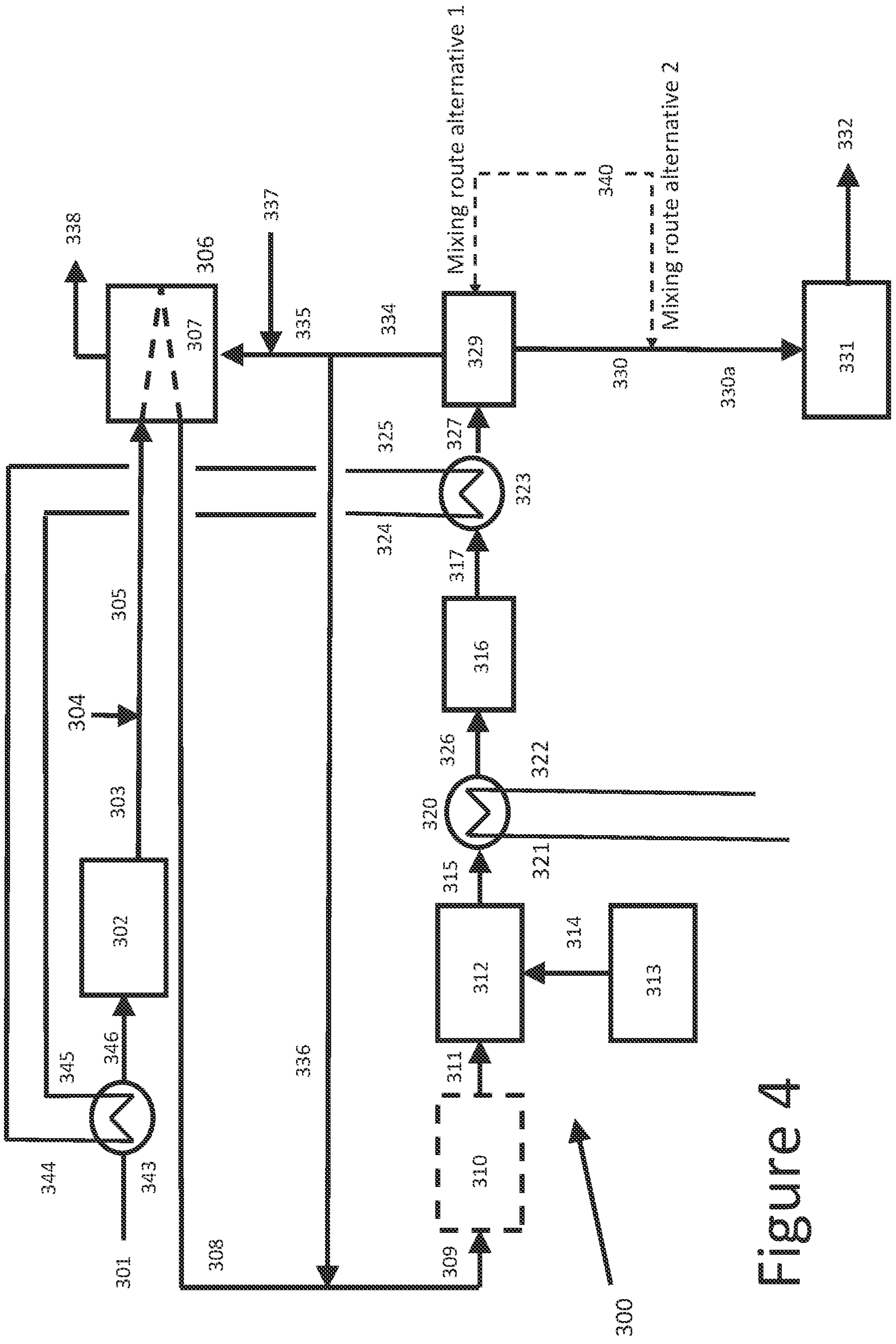
FIG. 4 is a schematic representation of another embodiment of an ammonia plant, in accordance with the present invention.

Turning FIGS. 3 and 4, ASU 313 produces oxygen containing stream 314. Hydrocarbon feedstock stream 301 is heated in feedstock preheater 343, thus producing heated feedstock stream 346.

Feedstock preheater 343 may exchange heat with first heat exchanger 320, thus obtaining heat from raw syngas stream 315 resulting in cooled raw syngas stream 326. In this arrangement, heat exchange lines 344 and 345 are thermally connected to heat exchange lines 321 and 322 (as illustrated in FIG. 3), Feedstock preheater 343 may exchange heat with second heat exchanger 323, thus obtaining heat from shifted syngas stream 317 resulting in cooled raw syngas stream 327. In this arrangement, heat exchange lines 344 and 345 are thermally connected to heat exchange lines 324 and 325 (as illustrated in FIG. 4).

Heated feedstock stream 346 is introduced into hydrogen desulfurization unit 302, thus producing desulfurized feed stream 303. Desulfurized feed stream 303 is combined with steam stream 304, thus forming ATR feed stream 305. ATR feed stream 305 is introduced into fired heater 306 thus producing preheated ATR feed stream 308, and flue gas stream 338. Heated ATR feed stream 308 is combined with purge gas recycle stream 336, thus forming combined ATR feed stream 309. Combined ATR feed stream 309 may then be introduced into optional pre-reformer 310, thereby optionally producing pre-reformed ATR feed stream 311. Combined ATR feed stream 309, or optional pre-reformed ATR feed stream 311, is then introduced into ATR 312 along with oxygen containing stream 314, thereby forming raw syngas stream 315.

Raw syngas stream 315 is then introduced into first heat exchanger 320, thereby producing further first cooled shifted syngas stream 326.

First heat exchanger 320 may provide heat to feedstock preheater 343, thus providing heat hydrocarbon feedstock stream 301. In this arrangement, heat exchange lines 321 and 322 are thermally connected to heat exchange lines 344 and 345. (as illustrated in FIG. 3)

First heat exchanger 320 may provide heat to the saturated steam stream 321 produced in the steam generating device located downstream ATR 312 and/or from steam generating device located downstream ammonia synthesis reactor 331 resulting in superheated steam stream 322 (as illustrated in FIG. 4).

Further cooled raw syngas stream 326 is introduced into water-gas shift reactor 316, thereby producing shifted syngas stream 317. Shifted syngas stream 317 is introduced into second heat exchanger 323, thereby producing cooled shifted syngas stream 327.

Second heat exchanger 323 may provide heat to the saturated steam stream 324 produced in the steam generating device located downstream ATR 312 and/or from steam generating device located downstream ammonia synthesis reactor 331 resulting in superheated steam stream 325 (as illustrated in FIG. 3).

Second heat exchanger 323 may provide heat to feedstock preheater 343, thus providing heat hydrocarbon feedstock stream 301. In this arrangement, heat exchange lines 324 and 325 are thermally connected to heat exchange lines 344 and 345 (as illustrated in FIG. 4).

The inventive solution allows a high intrinsic $CO_2$ capture rate in decarbonized ammonia production units with an overall low carbon intensity based on autothermal reforming which principally is targeted to achieve by reduction of heating demand from fired heater/heat of combustion.

The inventive solution comprises:

employing an efficient synthesis gas generation process for ammonia production that may consist of at least an oxygen based catalytic autothermal reforming step, at least one water-gas shift reaction step with at least one catalytic reactor and employing a $CO_2$ capture unit and a gas purification or gas conditioning unit, the efficient syngas generation process is characterized in such a way that there is a minimum requirement of process/by-product/utility heating by heat of combustion or electrical heat, The above characterization is configured by superheating the produced steam by heat recovery of the process gas in the syngas generation section, thereby eliminating the requirement of superheating the steam in the fired heater using heat of combustion of hydrocarbon fuel.

The inventive solution also comprises:

ammonia production based on pure oxygen-based catalytic autothermal reforming of hydrocarbon feedstock. In the autothermal reforming process, most of the hydrocarbon gets converted to CO and $H_2$. Before catalytic interaction, in the autothermal reactor, partial combustion of hydrocarbon takes place which is an exothermic reaction. High temperature originating from the exothermic reaction facilitates the catalytic reforming reaction which is endothermic in nature. Consequently, the reformed gas exits the autothermal reactor at high temperature. Downstream autothermal reforming, a water-gas shift section converts CO to $CO_2$ in presence of water. The water is added in the form of saturated or superheated steam upstream autothermal reforming and/or upstream water-gas shift. Downstream shift, $CO_2$ is removed by physical and/or chemical absorption of $CO_2$ and/or Cryogenic separation of $CO_2$. After $CO_2$ removal, the process gas contains mainly $H_2$. Based on the $CO_2$ removal process, $H_2$-rich process gas may contain impurities like unconverted $CH_4$, unconverted CO and traces of Ar. A gas purification/conditioning step is required in order to remove the impurities resulting in a pure $H_2$ stream or a mixture of pure $H_2$ and $N_2$ stream in the ratio of 3:1. This ratio is the stoichiometric number required for ammonia synthesis in the ammonia synthesis loop. Purge gas, as produced in the $CO_2$ removal section and/or gas purification/conditioning step, rich in impurities, is routed to the fired heater and/or recycled back to the reforming process to minimize the loss of carbon atom.

Process heat downstream autothermal reformer as well as downstream water-gas shift can be recovered efficiently by steam generation and/or preheating of feedstock and/or superheating of steam.

By superheating the steam utilizing process heat eliminates the requirement of superheating the steam in the fired heater using heat of combustion.

As the steam superheating is avoided by the heat of combustion, the process heat duty demand in the fired heater gets significantly reduced. This leads to significant reduction in the hydrocarbon fuel consumption for the fired heater and consequently results in negligible emission and considerably high direct $CO_2$ capture rate.

Superheated steam is also generated from the ammonia synthesis loop by means of the heat recovery attributing to the exothermic ammonia synthesis reaction.

Co-produced superheated steam from heat recovery of synthesis gas generation section (ATR+Shift) and of ammonia synthesis loop can be used to drive different compressors of the plant and/or to generate electricity and/or for exporting outside the plant.

With these inventive steps, it is possible to achieve a very high direct $CO_2$ capture rate without compromising the indirect capture rate, especially Scope 3 capture rate attributing to hydrocarbon feedstock consumption. As the steam superheating is executed utilizing the process heat and not by the heat of combustion, hydrocarbon fuel demand and hence carbon footprint of the plant gets significantly reduced. Apart from higher capture rate, cost of operation as well as capital investment gets minimized.

This solution distinguishes itself from others for the following reasons:

Achieving very high $CO_2$ capture rate (≥95-99%) without having any need of $H_2$ firing.

No $H_2$ firing need means no additional feedstock processing and thereby no additional utility consumption, hence a minimized operating cost.

No $H_2$ firing need also means the plant shall produce according to the product requirement and hence no oversizing leading minimized capital investment.

It is to be noted that to produce low carbon ammonia, the essential step is to produce a low carbon hydrogen-rich stream (>90 mole % H2) or low carbon ammonia syngas with hydrogen to nitrogen molar ratio of 3:1. Hence, all the embodiments cited may be used to produce low carbon hydrogen-rich stream (>90 mole % H2) only and utilize that hydrogen-rich stream for different usage other than ammonia production.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for producing ammonia synthesis gas to produce ammonia, comprising:

producing a raw syngas stream within an autothermal reformer from an ATR feed stream comprising a hydrocarbon feed stream and a steam stream, wherein the raw syngas stream comprises hydrogen, carbon monoxide, carbon dioxide, and water, cooling the raw syngas stream by vaporizing boiler feed water thereby producing a steam stream and a second syngas stream, the second syngas stream is mixed with water and/or steam added prior to introduction to a catalytic water-gas shift reactor thereby producing a minimum required ratio of steam to dry gas for the shift catalyst (>0.2 mol/mol), producing a first shifted syngas stream by shift reaction inside the catalytic water-gas shift reactor, producing a second shifted syngas stream by cooling the first shifted syngas stream by heat exchange with a steam stream superheater or a hydrocarbon feed stream or a mixed stream of hydrocarbon and steam or by raising steam or all of these, further cooling the second shifted syngas stream in subsequent step(s) prior to introduction to pre-combustion carbon dioxide capture unit producing at least one carbon dioxide-rich stream and one carbon dioxide-depleted stream, and preheating either a process stream or superheating a steam stream or both, with a supplementary fired heater wherein:

at least a portion of the ammonia synthesis gas stream is used for ammonia synthesis, the sum of the heat exchange duties taking place in the fired heater does not exceed 1 MWh/ton ammonia (on 100% ammonia purity basis) produced or 3 MWh/ton hydrogen (on 100% hydrogen purity basis) produced and the direct carbon dioxide emission from the ammonia production process does not exceed 0.7 kg carbon dioxide/kg ammonia (on 100% ammonia purity basis) produced or 2.5 kg carbon dioxide/kg hydrogen (on 100% hydrogen purity basis) produced.

2. The process of claim 1, wherein at least a portion of the ammonia synthesis gas stream is used for any usage other than ammonia synthesis.

3. The process of claim 1, wherein the pre-combustion carbon dioxide capture unit is preceded or succeeded by a hydrogen purification unit thereby producing at least a portion of the ammonia synthesis gas stream (>90 mole % hydrogen purity).

4. The process of claim 3, wherein an external nitrogen-containing stream is added to at least a portion of ammonia synthesis gas stream (>90 mole % hydrogen purity) to produce at least an ammonia synthesis gas stream having a hydrogen to nitrogen molar ration of 3:1.

5. The process of claim 1, wherein the ATR feed stream passes through a pre-reforming stage.

6. The process of claim 1, wherein the fired heater is supplemented by an electric heater.

7. A process for producing ammonia synthesis gas to produce ammonia, comprising:

producing a raw syngas stream within an autothermal reformer from an ATR feed stream comprising a hydrocarbon feed stream and a steam stream, wherein the raw syngas stream comprises hydrogen, carbon monoxide, carbon dioxide, and water, cooling the raw syngas stream by vaporizing boiler feed water thereby producing a steam stream and a second syngas stream, superheating a steam stream by utilizing the sensible heat of the second syngas stream, thereby producing a third syngas stream, the third syngas stream is mixed with water and/or steam added prior to introduction to a catalytic water-gas shift reactor thereby producing a minimum required ratio of steam to dry gas for the shift catalyst (>0.2 mol/mol), producing a first shifted syngas stream by shift reaction inside the catalytic water-gas shift reactor, producing a second shifted syngas stream by cooling the first shifted syngas stream by heat exchange with a hydrocarbon feed stream or a mixed stream of hydrocarbon and steam or by raising steam or all of these, further cooling the second shifted syngas stream in subsequent step(s) prior to introduction to pre-combustion carbon dioxide capture unit producing at least one carbon dioxide-rich stream and one carbon dioxide-depleted stream, and preheating either a process stream or superheating a steam stream or both, with a supplementary fired heater wherein:

at least a portion of the ammonia synthesis gas stream is used for ammonia synthesis, the sum of the heat exchange duties taking place in the fired heater does not exceed 1 MWh/ton ammonia (on 100% ammonia purity basis) produced or 3 MWh/ton hydrogen (on 100% hydrogen purity basis) produced and the direct carbon dioxide emission from the ammonia production process does not exceed 0.7 kg carbon dioxide/kg ammonia (on 100% ammonia purity basis) produced or 2.5 kg carbon dioxide/kg hydrogen (on 100% hydrogen purity basis) produced.

8. The process of claim 7, wherein at least a portion of the ammonia synthesis gas stream is used for any usage other than ammonia synthesis.

9. The process of claim 7, wherein the pre-combustion carbon dioxide capture unit is preceded or succeeded by a hydrogen purification unit thereby producing thereby producing at least a portion of the ammonia synthesis gas stream (>90 mole % hydrogen purity).

10. The process of claim 9, wherein an external nitrogen-containing stream is added to at least a portion of the ammonia synthesis gas stream (>90 mole % hydrogen purity) to produce at least an ammonia synthesis gas stream having a hydrogen to nitrogen molar ration of 3:1.

11. The process of claim 7, wherein the ATR feed stream passes through a pre-reforming stage.

12. The process of claim 7, wherein the fired heater is replaced and/or supplemented by an electric heater.

13. A process for producing ammonia synthesis gas to produce ammonia, comprising:

producing a raw syngas stream within an autothermal reformer from an ATR feed stream comprising a hydrocarbon feed stream and a steam stream, wherein the raw syngas stream comprises hydrogen, carbon monoxide, carbon dioxide, and water, cooling the raw syngas stream by vaporizing boiler feed water thereby producing a steam stream and a second syngas stream, heating a hydrocarbon feed stream by using the sensible heat of the second syngas stream, thereby producing a third syngas stream, the third syngas stream is mixed with water and/or steam added prior to introduction to a catalytic water-gas shift reactor thereby producing a minimum required ratio of steam to dry gas for the shift catalyst (>0.2 mol/mol), producing a first shifted syngas stream by shift reaction inside the catalytic water-gas shift reactor, producing a second shifted syngas stream by cooling the first shifted syngas stream by heat exchange with a steam stream superheater or a hydrocarbon feed stream or a mixed stream of hydrocarbon and steam or by raising steam or all of these, further cooling the second shifted syngas stream in subsequent step(s) prior to introduction to pre-combustion carbon dioxide capture unit producing at least one carbon dioxide-rich stream and one carbon dioxide-depleted stream, and preheating either a process stream or superheating a steam stream or both, with a supplementary fired heater wherein:

at least a portion of the ammonia synthesis gas stream is used for ammonia synthesis, the sum of the heat exchange duties taking place in the fired heater does not exceed 1 MWh/ton ammonia (on 100% ammonia purity basis) produced or 3 MWh/ton hydrogen (on 100% hydrogen purity basis) produced and the direct carbon dioxide emission from the ammonia production process does not exceed 0.7 kg carbon dioxide/kg ammonia (on 100% ammonia purity basis) produced or 2.5 kg carbon dioxide/kg hydrogen (on 100% hydrogen purity basis) produced.

14. The process of claim 13, wherein at least a portion of the ammonia synthesis gas stream is used for any usage other than ammonia synthesis.

15. The process of claim 13, wherein the pre-combustion carbon dioxide capture unit is preceded or succeeded by a hydrogen purification unit thereby producing thereby producing at least a portion of the ammonia synthesis gas stream (>90 mole % hydrogen purity).

16. The process of claim 15, wherein an external nitrogen-containing stream is added to at least a portion of the ammonia synthesis gas stream (>90 mole % hydrogen purity) to produce at least an ammonia synthesis gas stream having a hydrogen to nitrogen molar ration of 3:1.

17. The process of claim 13, wherein the ATR feed stream passes through a pre-reforming stage.

18. The process of claim 13, wherein the fired heater is supplemented by an electric heater.

* * * * *